United States Patent [19]
Chauvel et al.

[11] Patent Number: 5,483,554
[45] Date of Patent: Jan. 9, 1996

[54] MODULATOR ESPECIALLY FOR DIGITAL CELLULAR TELEPHONE SYSTEM

[75] Inventors: Gerard Chauvel; Gael Clave, both of Antibes; Marc Couvrat, Saint Laurent du Var, all of France

[73] Assignee: Texas Instruments Incorporated, Dallas, Tex.

[21] Appl. No.: 973,905

[22] Filed: Nov. 10, 1992

[51] Int. Cl.$^6$ ............................ H03C 3/00; H03K 7/06; H04L 27/12

[52] U.S. Cl. ........................ 375/303; 333/103; 333/105; 364/571.01; 455/54.1

[58] Field of Search .......................... 375/67; 332/103, 332/105, 104; 364/571.01; 455/54.1, 55.1, 56.1, 49.1, 42

[56] References Cited

U.S. PATENT DOCUMENTS

| | | | |
|---|---|---|---|
| 5,210,705 | 5/1993 | Chauvel et al. | 364/724.16 |
| 5,274,636 | 12/1993 | Halter et al. | 370/85.1 |
| 5,299,189 | 3/1994 | Takahashi | 370/85.1 X |

FOREIGN PATENT DOCUMENTS

| 2678400 | 6/1991 | France | 364/724.16 |
|---|---|---|---|

Primary Examiner—Stephen Chin
Assistant Examiner—Bryan E. Webster
Attorney, Agent, or Firm—William E. Hiller; Richard L. Donaldson

[57] ABSTRACT

Modulator especially for digital cellular telephone systems, characterised in that it comprises a programmable peripheral processor (25) carrying out, with the same circuits, the modulation function and the channel coder/decoder tasks.

3 Claims, 5 Drawing Sheets

MODULATOR ESPECIALLY FOR DIGITAL CELLULAR TELEPHONE SYSTEM

The present invention relates to the digital cellular telephone systems using the time division multiple access (TDMA) method, for example the GSM method.

BACKGROUND OF THE INVENTION

In these digital cellular telephone systems, three main functions must be carried out for processing the base band.

1—Speech coding/decoding;

2—Channel coding/decoding (CRC/parity coding, convolution coding, interlacing, deinterlacing, Viterbi decoding, parity check/CRC);

3—Modulator/demodulator, modem.

Currently, these functions are implemented in three separate functional units.

By reason of the time division multiple access method (TDMA), the operating time ratio of some of these units is very low.

For example, the modulator which is an element whose task is indivisible is implemented with a dedicated operator activated for a constant period of time.

In the GSM system, the maximum value of this ratio for the modulator is 12.5%, but overall it is less than 0.2%.

In current implementations, the circuitry resources necessary for this operator cannot be re-used to carry out other tasks during the periods of inactivity.

This digital modulator operator is usually implemented within linear parts, close to converters and requires a mixed digital/linear technology which is a penalty on the digital part.

SUMMARY OF THE INVENTION

The invention proposes to remedy these drawbacks by creating a modulator/demodulator whose construction does not compromise the operation of digital circuits with which it might be associated.

The subject of the invention is therefore a digital modulator comprising a programmable peripheral processor which carries out, with the same circuits, the modulation function and the channel coder/decoder tasks.

Such an arrangement allows optimum utilisation of the circuit resources and, by this fact, improves the efficiency of the silicon employed in the construction of the corresponding integrated circuits.

BRIEF DESCRIPTION OF THE DRAWINGS

The invention will be better understood with the aid of the description which will follow, given solely by way of example and given by referring to the attached drawings, in which.

DESCRIPTION OF PREFERRED EMBODIMENT

Figure 1:
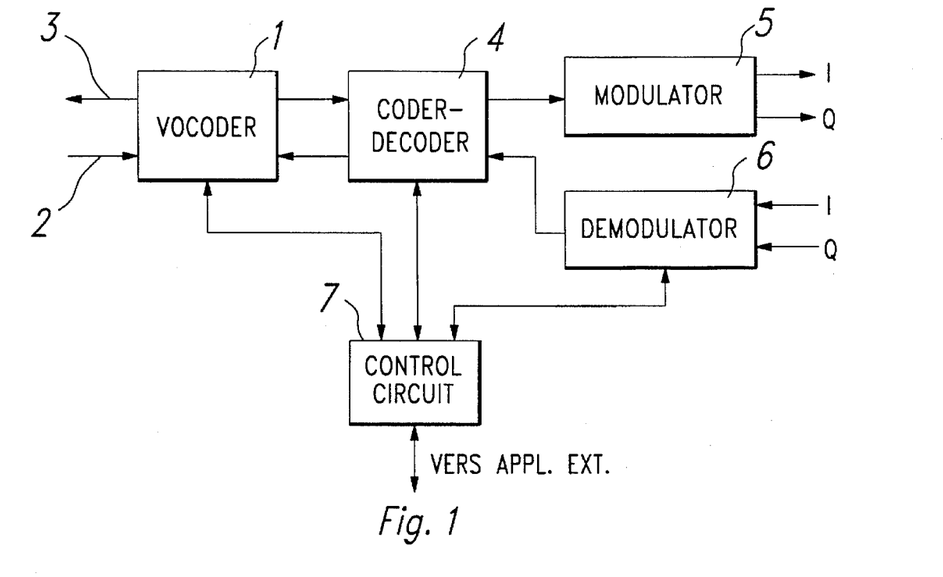
FIG. 1 represents the block diagram of a terminal of the time division multiple access type.

The terminal of the time division multiple access type represented in FIG. 1 comprises a vocoder 1 receiving an audio signal on one input 2 and delivering an audio signal as an output signal on an output 3.

The vocoder 1 is, for example, of the RPE - LTP 13 KBT/S of the GSM type.

It is linked to a coder-decoder 4 one output of which is linked to a modulator 5 delivering, at its outputs, I and Q signals to a linear circuit and one input of which is linked to a demodulator 6 whose inputs receive the I and Q signals originating from the linear circuit.

The coder-decoder 4 is, for example, a bit manipulation coder with convolution coding and Viterbi decoding.

The modulator 5 is based on a ROM while the demodulator 6 comprises a complex-type short-word processor.

The circuits 1, 4 and 6 are connected to a control circuit 7 which also comprises a communication output with an external application.

Figure 2:
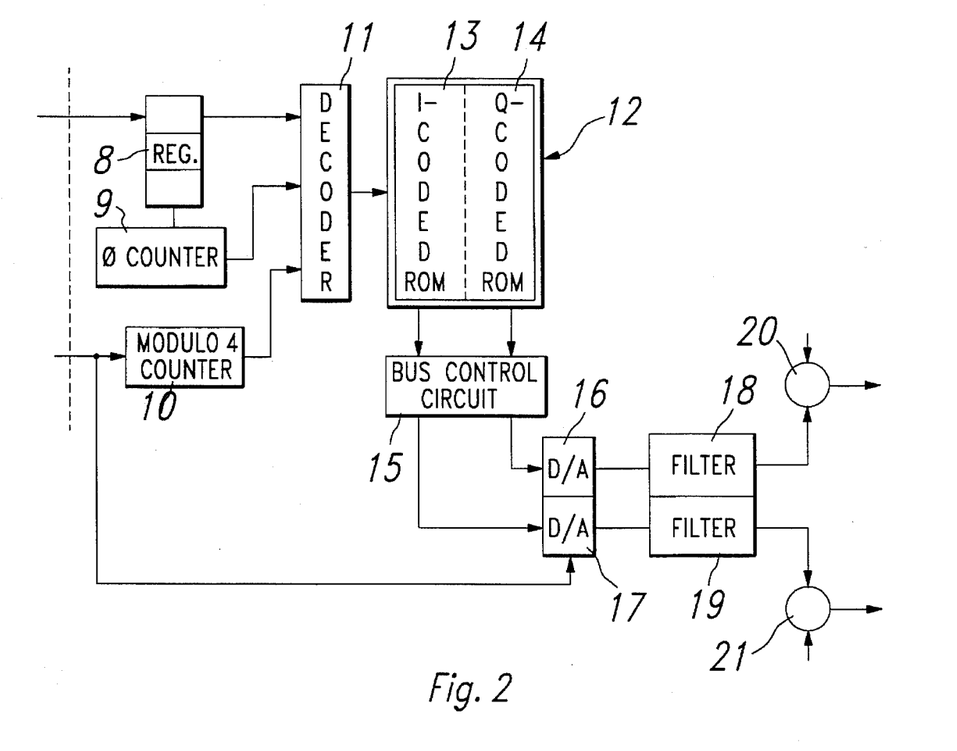
FIG. 2 represents the block diagram of the known digital modulator.

The modulator 5 represented in more detail in FIG. 2 mainly comprises a three-stage shift register 8 whose input receives binary data from the coder-decoder 4 (FIG. 1) and which comprises an output linked to a phase Ø state counter 9.

A modulo 4 counter 10, receives input signals from the sampling clock. The shift register 8 delivers 3-bit signals on a second output.

The Ø state counter 9 delivers 2-bit signals at its output.

The modulo 4 counter 10 delivers 2-bit signals at its output. The 3- and 2-bit outputs, of the three abovementioned circuits are connected to corresponding inputs of a 7-bit decoder 11.

The output of the decoder 11 is linked to a coded wave form memory 12 which is subdivided into a I-coded 128 word ROM memory 13 and a Q-coded 128 word ROM memory 14.

The outputs of the ROM memories 13 and 14 are connected to a bus control circuit 15 whose outputs are, in their turn, linked to digital-analog converters 16 and 17 for the Q and I signals controlled by the sampling clock signals applied to the modulo 4 counter 10.

The analog output of the Q signals from the converter 16 is linked to the input of a linear phase filter 18 while the output of the converter 17 is connected to the input of another linear phase filter 19.

The outputs of the filters 18 and 19 are connected respectively to multipliers 20 and 21 which moreover receive signals sin [ωot] and cos [ωot] and which deliver Q and I signals at their outputs.

Figure 3:
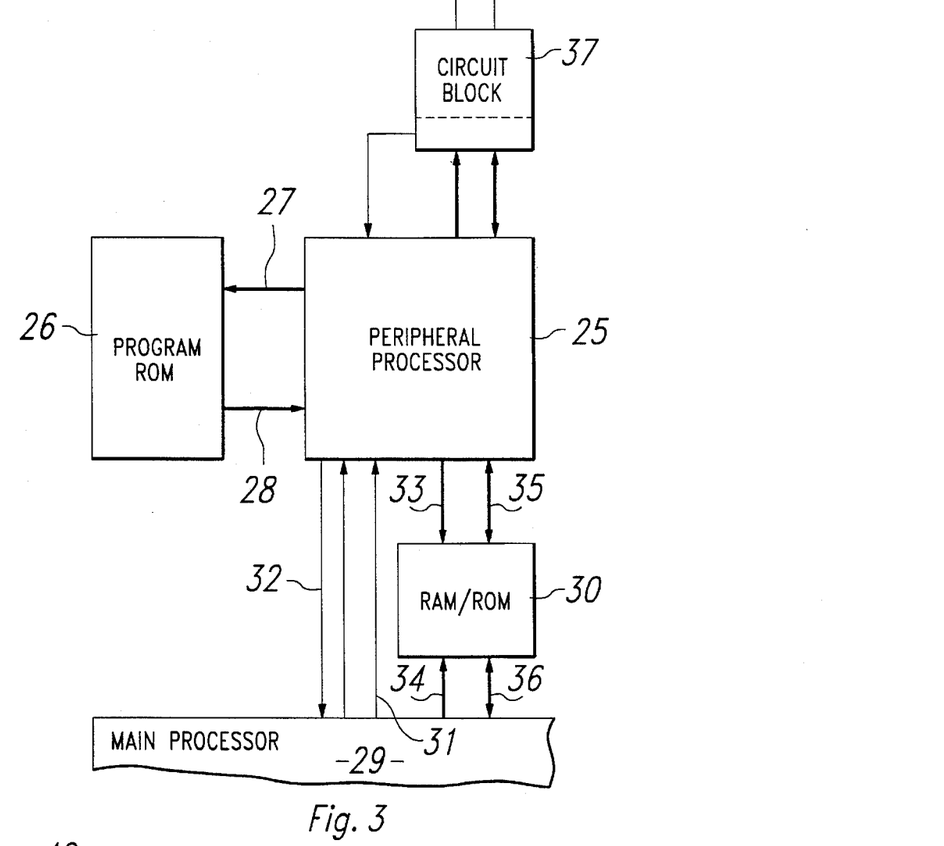
FIG. 3 represents the block diagram of the processor associated, according to the invention, with the modulator of FIG. 2.

The peripheral processor of the modulator according to the invention is represented diagrammatically in FIG. 3.

It comprises a peripheral processor 25 connected to a program ROM memory 26 via an address bus 27 and a program bus 28.

The program stored in the memory 26 contains the modulation code and the coder code (channel decoder).

The processor 25 is linked to a main processor 29, for example of the DSP or microcontroller type, by means of a partitioned memory 30 which is a two-port RAM/ROM memory.

It is furthermore linked to the main processor 29 via a test and adjustment line 31 and via interrupt lines 32.

The processor 25 is advantageously a protocol processor of the type described in U.S. patent application Ser. No. 07/902,191 filed Jun. 22, 1992.

The link between the processors 25 and 29, by means of the memory 30 is produced by means of respective address 33, 34 and data 35, 36 buses.

The partitioned memory 30 contains local variables as well as the symbols which have to be modulated. It also contains, in its ROM part, a table for storing the basic configurations for the modulator. The peripheral processor 25 is linked to a circuit block 37 which contains a register for the output of the modulated samples (I, Q) which are counted by the peripheral processor.

The samples are delivered at a rate which is fixed by the interrupt line 32.

The architecture of the assembly has been optimised in order to as far as possible reduce the interrupt latency (2 cycles) and the system time (2 cycles) for employing the modulator.

Table 1 which follows represents the modulation process in pseudocode.

TABLE 1

MAIN SUB-PROGRAM FOR THE MODULATOR.
LOOP COUNT = SAM.N-A-TX; init. LOOP COUNT
with a number of symbols to be transmitted.
REPEAT UNTIL LOOP COUNT = 0
TAKE NEW SYMBOL
Left shift the SYMB 1 instant; shift delay line (delay
line is 3 symbols)
Include new line in delay line SYMB;
IF (new symbol = 0) THEN
          STATE = STATE + 32
ELSE
          STATE = STATE + 96
ENDIF
STATE = STATE [96]; state is incremented with modulo 96
X = STATE/SYMB concatenation; concatenation is of
3 useful bits (the 2 most significant bits of the state,
3 least significant bits of the SYMB) left shifted twice
X = X + #TABCOS ; X contains the address in the table for
the sample buffer to be transmitted (4 samples)
WAIT UNTIL THE CURRENT BAUD IS TRANSMITTED:
wait until the two least significant bits B are zero
B = X; the address for the buffer to be transmitted is
      new
LOOP COUNT = LOOP COUNT - 1
END DO LOOP
INTERRUPT SUB-PROGRAM FOR THE MODULATOR
OUTPUT SAMPLE ADDRESSED BY B TO EXTERNAL
REGISTER;
INCREMENT B REGISTER
RETURN, return from the interrupt.

TABLE 2

| SYMB TX MOVE | #4.h,NZ | ; | if symbol is 1 then A.h = 4 (else A.h = 0) |
| | | ; | obtain preceding symbol in A.I |
| | | ; | save new symbol |
| | | ; | carry out the differen- |

TABLE 2-continued

| | | | tial coding |
|---|---|---|---|
| MOVE | SYMBX | ; | shift delay line |
| SLL | X | | |
| OR | A.h, X.L | ; | include new symbol in delay line |
| AND | #28, X | ; | keep 3 bits |
| MOVE | X,SYMB | ; | save symbol delay line |
| MOVE | #32,A.H. | ; | the default is + PI/2 |
| AND | #4, X.L | ; | |
| MOVE | #96, A.H,NZ | ; | else it is −PI/2 |
| ADD | STATE, A.H | ; | |
| AND | #96, A.H | ; | calculate the value of the new state |
| MOVE | A.H., STATE | ; | save new state value |
| ADD | A,H, X.L. | ; | add shift to the table |
| ADD | #TABCOS,X | ; | calculate new sin, cos table address |
| WAIT FOR BD PAUSE | | | |
| AND | #3, B.L | | |
| BNZ | WAIT FOR BD | ; | wait for new baud |
| MOVE | X,B | ; | B contains the address of the (cos, sin) table first element |
| RTS | (Return To Subroutine) | ; | from SYMBTX |

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
*    TRANSMISSION INTERRUPT SUB-PROGRAM  *
*    This interrupt transmits a complex sample       *
*    It takes place at 1084 kHz = (922.5 ns)         *
*    ( 4 samples/baud at band rate of 271 kHz)    *
*    922.5 ns corresponds to 24 cycles)           *
*    Uses/corrupts the B,POO register            *
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

| TX INT (B) +, POO | ; | POO is a complex (I,Q) sample value |
|---|---|---|
| RTI | ; | interrupt execution is 4 cycles. |

Figure 4:
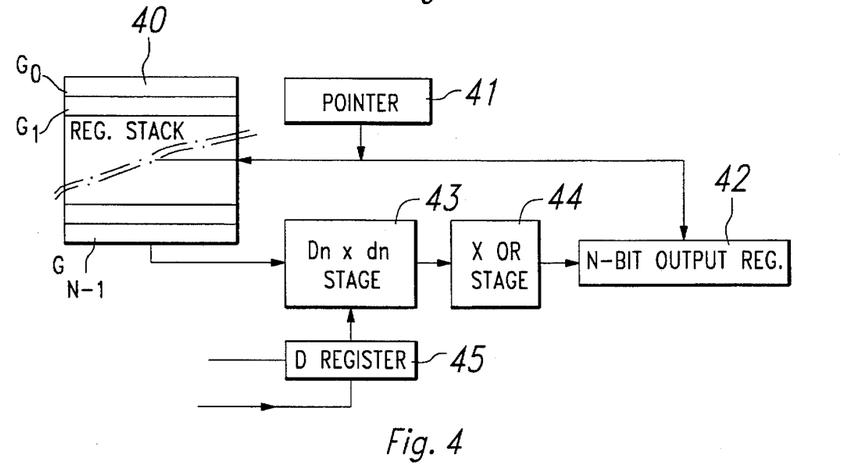
FIG. 4 is a block diagram of an embodiment of an N-state convolution circuit.

In FIG. 4 is represented a variant of the N-state convolution circuit.

It employs the implementation of N convolutions cyclically.

It comprises an N-level register stack 40 intended to stack N polynomials $G^i$.

To the register stack 40 is added a stack pointer 41 which controls the position in the coding cycle and the transfer of the results, $G^i$ or I.

The N results $G^i$ or I are transferred sequentially into an N-bit output register 42.

The output of the stack 40 is linked to the output register by means of $D_n \times d_n$ and XOR stages 43, 44.

Finally, a D register 45 is linked to the $D_n \times d_n$ circuit 43.

One input of the register 45 is a data input and its other input receives the signals $R_g$ $C_k$.

GMSK modulation is a constant-envelope modulation of the MSK type whose phase transitions are smoothed by a gaussian filter.

Let $\alpha$ be the sequence to be transmitted.

$$\alpha = \ldots \alpha_{n-2}, \alpha_{n-1}, \alpha_n, \alpha_{n+1}, \alpha_{n+2}, \ldots$$

The signal sent is of the form:

$$s(t,\alpha) = \sqrt{2E/T} \cos[2\pi f_o t + \emptyset(t,\alpha) + \emptyset o]$$

2E/T represents the energy per symbol sent.
The message is contained in the phase information $\emptyset(t,\alpha)$.
$\emptyset o$ is an arbitrary phase.
In the case of GSM, the $\alpha i$ all have the same probability of appearance and are described by a two-level alphabet.

As for the filtering, by definition of the modulation principle, the sequence α passes into a premodulation filter,
Let g (t) be the pulse response of the filter.
The maximum phase excursion in Ø (t, α) is normalised by $$\Delta\phi_{max} = (M-1) h\pi \quad M = 2 \text{ (binary alphabet } +1, -1)$$
$$h = \text{modulation index}$$

then:

$$\phi(t, \alpha) = 2\pi h \sum_{i=-\infty}^{+\infty} \alpha_i q(t - iT)$$

with $$q(t) = \int_{-\infty}^{T} g(t)\, d(r)$$

Referring to the GSM specifications, it is seen that g(t) is, by definition, a Gauss function whose typical deviation is normalised by the product BT, B being the width of the equivalent filter (at 3 db), T, the duration of a symbol.

Noting that g(t) is limited in time, g(t)=0 if t<0 and constant for t> LT with L= limit length of number of correlated symbols, then:

$$\phi(t, \alpha) = 2\pi h \sum_{i=-\infty}^{n} \alpha_i q(t - iT)$$
$$= \underbrace{2\pi h \sum_{i=n-L+1}^{n} \alpha_i q(t - iT)}_{\Theta(t, \alpha)} + \underbrace{h\pi \sum_{i=-\infty}^{n-L} \alpha_i}_{\Theta n}$$

With $nT < t < (n+)T$

The appearance of the symbols at nT, Ø(t,α) is defined by:
Θ(t, α) * correlated state vector which provides transmission of (n−1) T at nT which is as smooth as possible.
There will be $2^{L-1}$ possible correlated states.
Θn * a phase state Θn
The signal to be sent for the modulator will now be examined.
This signal may be expressed in the form:

$$s(t, \underline{\alpha}) = \sqrt{2E/T}\ \{I_{(t)} \cos(2\pi f_o t) - Q(t) \sin(2\pi f_o t)\}$$

Figure 5:
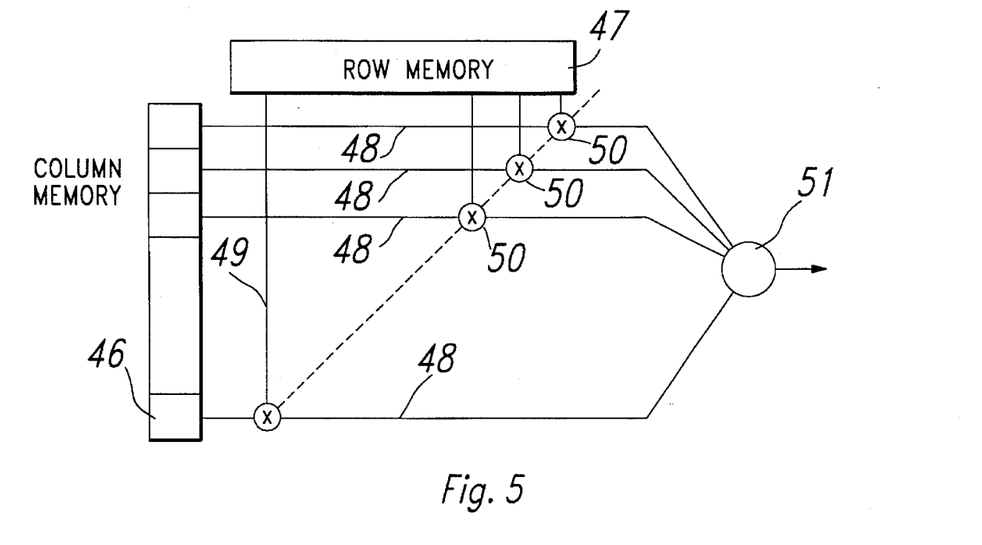
FIG. 5 is a diagram of the general structure of the filter included in the construction of the modulator according to the invention.

$I_{(t)} = \cos[\phi(t, \underline{\alpha})]$
$Q(t) = \sin[\phi(t, \underline{\alpha})]$
with $\phi(t, \underline{\alpha}) = \Theta(t, \underline{\alpha}) + \Theta_n$
$I(t) = \cos[\Theta(t, \underline{\alpha})] \cdot \cos\Theta_n - \sin[\Theta(t, \underline{\alpha})] \cdot \sin\Theta_n$
$Q(t) = \cos[\Theta(t, \underline{\alpha})] \cdot \sin\Theta_n + \sin[\Theta(t, \underline{\alpha})] \cdot \cos\Theta_n$ $$\Theta[t, \underline{\alpha}] = 2\pi h \left[\sum_{n-L+1}^{n} \alpha_i q(t - iT)\right]$$

q(t) is the pulse response of the modulator filter; this response will be modelled by L coefficients, Θ(t,α) is thus defined by:
—the sequence of the L αi's
—the L coefficients of the filter
The equivalent structure of this filter is represented in FIG. 5.
This filter comprises a column memory 46 containing the coefficients Q1 to QL of the filter, and a row memory 47 containing the data sequence αn ... αn−L+1, linked by line 48 and column 49 conductors.

The data and the coefficients are combined by multiplication in multipliers 50 placed at the intersections of the conductors 48, 49 and summed in a summer of 51 which delivers a signal Θ(t, α) at its output.

Noting that αi=(+1, −1), the multiplications are replaced either by transfers, or by inversions.

According to one variant, it is possible to have $2^L$ different sequences weighted by the set of coefficients $Q_i$. The $2^L$ weighted sequences may be acquired in a ROM memory (not represented) whose address vector is equivalent to the αi vector.

In order to carry out sampling, it is necessary to generate the signals cos [Θ(t,α)] and sin [Θ(t,α)].

The simplest way is to memorise the cos and sin signals in a table.

It is known that 8 to 16 samples would be necessary per symbol, each sample being coded over 8 bits.

Figure 6:
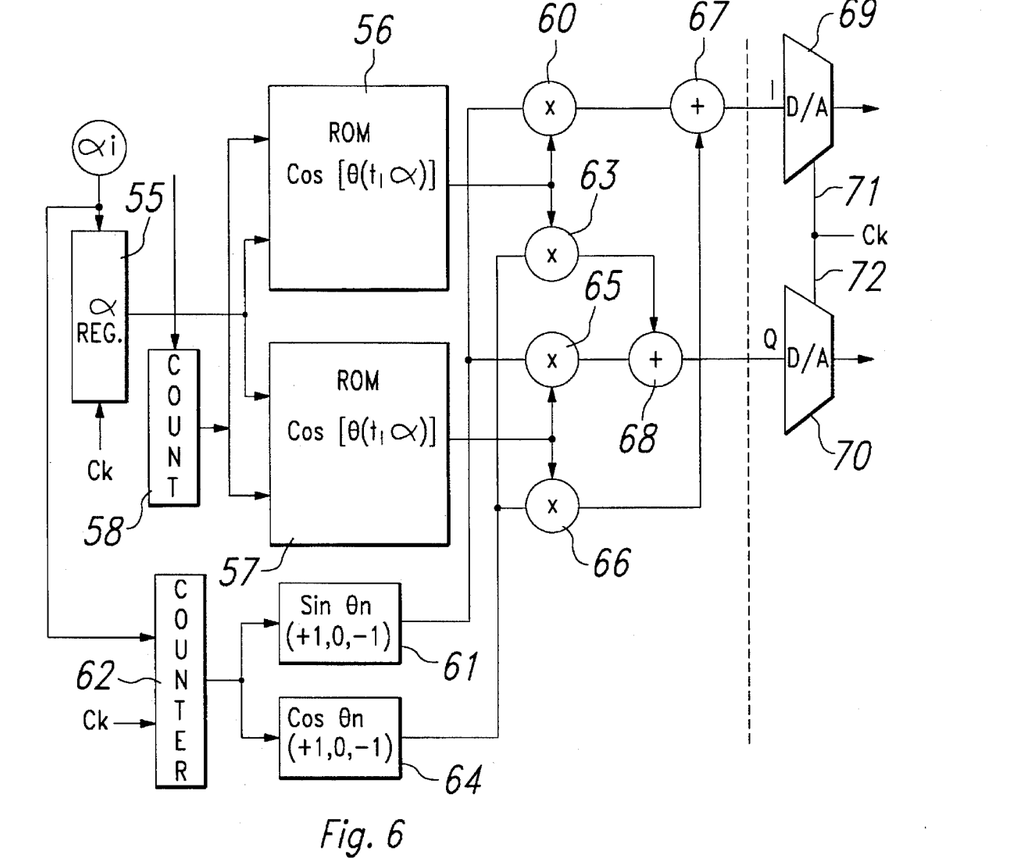
FIG. 6 is a detailed diagram of a GMSK modulator.

The GMSK modulator is shown in FIG. 6.

It comprises mainly an input shift register 55 for the data αi which is controlled by a data clock signal Ck.

The output of the register 55 is connected to an input of a ROM memory 56 for storage of the values of cos [Θ(t, α)] and to an input of a ROM memory 57 for storing values of sin [θ(t,α)] each moreover having a sampling input connected to the output of a sampling count circuit 58 controlled by a sampling clock signal 59.

The output of the ROM memory 56 is applied to one 10 input of a first multiplier 60 another input of which is linked to a generator circuit 61 for a sin αn {+1,0,−1} signal controlled by the input data of the circuit by means of an up-down counter 62.

The output of the ROM memory 56 is applied to one input of a second multiplier 63 another input of which is connected to the output of a generator circuit 64 for a cos αn {+1,0,−1} signal itself also controlled by the up-down counter 62.

The output of the memory 57 is connected to inputs of a third and of a fourth multiplier 65, 66 whose other inputs are connected respectively to the generator circuits 61, 64 for the sin θn and cos θn signals.

The cos θ.sin θ$_n$ signal appearing at the output of the first multiplier 60 is applied to one input of a first adder 67 another input of which receives the sin Θ.cos Θn output signal from the fourth multiplier 66.

The cos Θ.cos Θn output signal from the second multiplier 63 is applied to one input of a second adder 68 another input of which receives the sin Θ.sin Θn output from the third multiplier 65.

The outputs of the first and second adders 67 and 68 are connected respectively to the inputs of digital-analog converters 69, 70 controlled by a clock signal applied to their corresponding clock inputs 71, 72.

The operation of the modulator described with reference to FIG. 6 is as follows.

The sequence e is stored in the shift register 55 whose outputs are decoded in order to generate the $2^L$ page addresses corresponding to the $2^L$ different possible sequences.

L represents the limit length of the code and the number of bits stored in the register 55.

Each symbol is coded by n samples coded over 8 bits. The total number of words is $(2^L \times \eta) \times 2$.

The ROM memories 56, 57 for cos [θ(t,α)] and sin [Θ(t,α)] contain the $2^n \times \eta$ possible values of cos [Θ(t,α)] and sin [Θ(t,α)], θ(t,α) representing the correlative part of the phase. The phase states are coded by the two-bit counter 62.

A binary symbol "1" corresponds to +1 and "0" to −1.

The counter 62 is incremented or decremented by the data clock signal. It is incremented if $\alpha i=1$ and decremented if $\alpha i=0$.

The four states possible at the output of the counter 62 correspond to $n\pi/2(2n)$. The sin θn and cos θn tables contain only the values $\{+1,0,-1\}$.

The four multipliers 60,63,65,66, as indicated above, produce the products cos [θ(t,α)]cos θn, cos [θ(t,α)] sin θn, sin [θ(t,α)] cos θn and sin [θ(t,α)] sin θn.

The four outputs of the multipliers are added two by two in the adders 67, 68 in order to form the I and Q signals and then converted in order to form the analog I and Q paths.

Table 3 below gives the state of the two-bit up-or/down counter 62.

TABLE 3

| State | SinΘn | CosΘn |
|-------|-------|-------|
| 0 | 0 | 1 |
| 1 | +1 | 0 |
| 2 | 0 | −1 |
| 3 | −1 | 0 |

The modulator of FIG. 6, the digital-analog converters excluded, may be broken down into two parts:
—an operator part comprising the counters 55, 62, 58, the multipliers 60,63,65,66, the adders 67 and 68.
—a part operated on with the tables 56,57,61,64.

In the case of the embodiment of FIG. 3, with the processor 25, the operator part is implemented in the peripheral processor, while the parts operated on are stored in the partitioned memory 30, the samples of the I and Q signals being stored in the memory 37.

Figure 7:
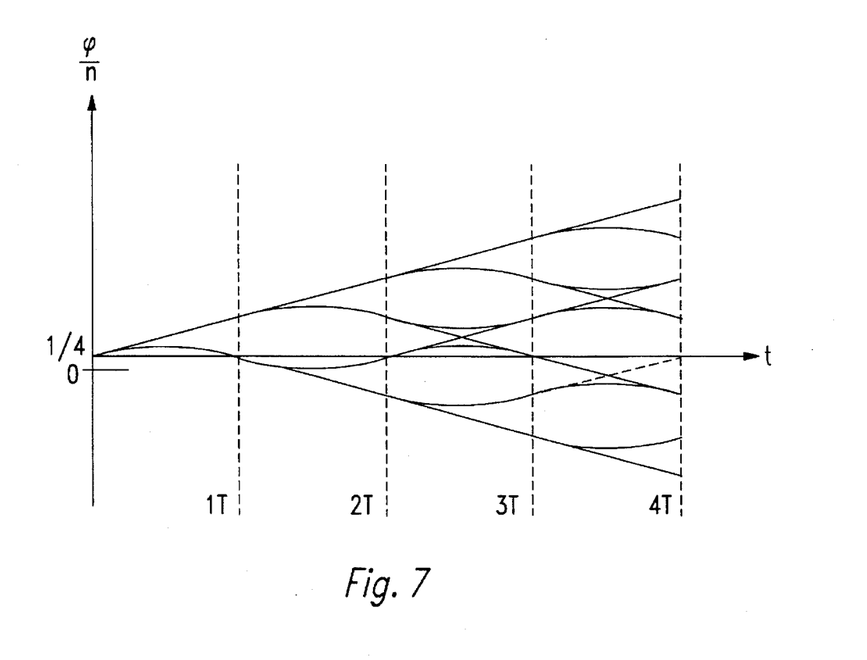
FIG. 7 is a diagram representing a trellis beginning with a phase reset to zero.

FIG. 7 is a graphical representation of a trellis initialised with a phase set to 0.

As this figure shows, the binary data are converted by the modulator into a constant-envelope signal whose phase may follow a certain number of different trajectories. The figure shows all the possible trajectories which the phase can follow over the first four data items sent.

The initial phase has been set to zero for convenience. From the first data item, the first two trajectories corresponding either to the binary "1" for the straight-line trajectory, or to the "0" for the arched trajectory can be seen. Subsequently, sending of a "1" will tend to augment the phase, while sending of a "0" will tend to reduce it.

Figure 8:
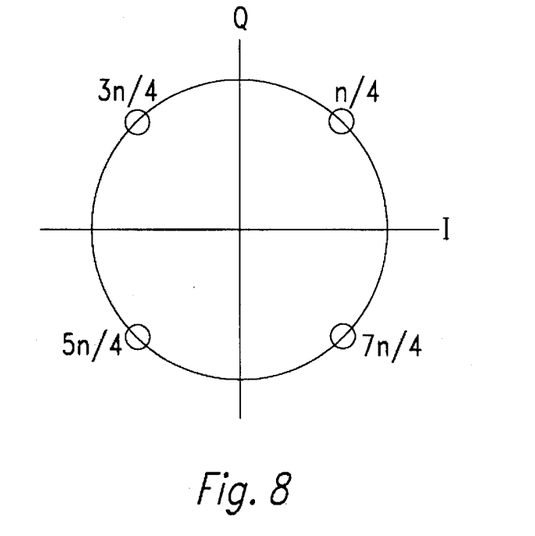
FIG. 8 represents a GMSK phase constellation.

FIG. 8 represents the constellation of phases obtained with the GMSK modulator of FIG. 6.

The modulated signal is assimilated to a rotating vector in the complex plane. The figure shows the different positions of the end of the vector taken in the middle of the data item.

Figure 9:
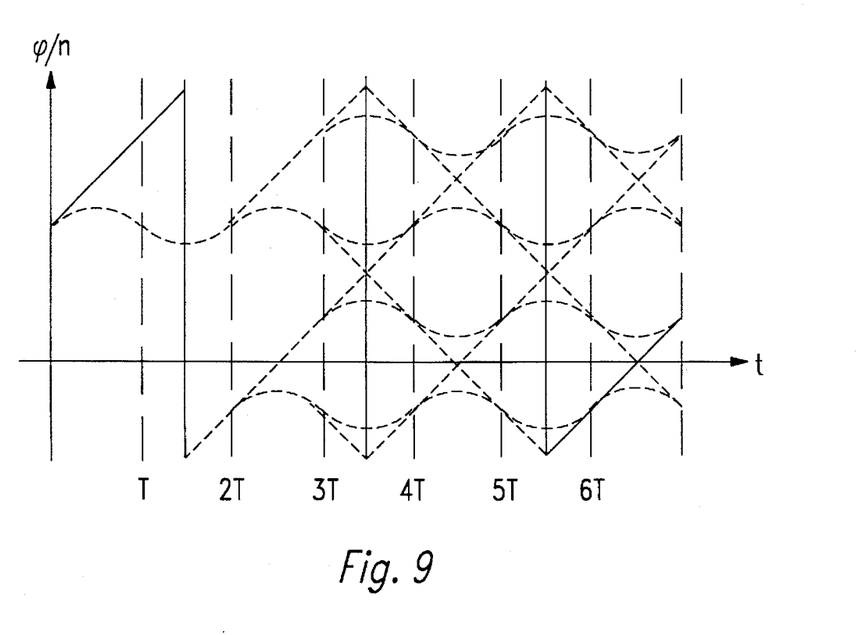
FIG. 9 represents a GMSK phase trellis.

FIG. 9 is a diagram representing the phase trellis of the GMSK modulator.

This figure represents the "diagram of the eye" over the phase of the signal sent. Here the phase is counted between $-\pi/2$ and $1.5\pi$.

We claim:

1. A modulator especially for digital cellular telephone systems, comprising:

a programmable peripheral processor having respective circuits for carrying out a modulation function and channel coder/decoder tasks, the circuits for carrying out the modulation function and the channel coder/decoder tasks being the same circuits;

a partitioned RAM/ROM memory containing local variables and symbols which are to be modulated;

the ROM part of said partitioned memory including a table for storing the basic configurations for the modulator;

said partitioned memory being interposed between said peripheral processor and a main processor; and an address bus and a data bus interconnecting said partitioned memory between said peripheral processor and the main processor.

2. A modulator as set forth in claim 1, including a circuit block linked to said peripheral processor;

said circuit block including a register for receiving the output of modulated samples counted by said peripheral processor.

3. A modulator as set forth in claim 1, further including respective counters, multipliers and adders implemented in said programmable processor for carrying out the modulation function;

a first read-only-memory for storing values of cos [θ(tα)];

a second read-only-memory for storing values of sin [θ(t,α)];

a first generator circuit for producing a sin θn(+1,0,−1) signal; and a second generator circuit for producing a cos θn(+1,0,−1) signal.

* * * * *

UNITED STATES PATENT AND TRADEMARK OFFICE
CERTIFICATE OF CORRECTION

PATENT NO. : 5,483,554
DATED : January 9, 1996
INVENTOR(S) : Gerard Chauvel, Gael Clave and Marc Couvrat It is certified that error appears in the above-identified patent and that said Letters Patent is hereby corrected as shown below:

<u>Title page,</u>
Item [30], Foreign Application Priority Data, add:
-- Nov. 14, 1991  [FR]   France ............ 91 13980 --

Signed and Sealed this

Third Day of September, 2002

*Attest:*

*Attesting Officer*

JAMES E. ROGAN
*Director of the United States Patent and Trademark Office*